United States Patent [19]
Vail et al.

[11] 3,956,681
[45] May 11, 1976

[54] BACK GAUGE POSITION FEED BACK SIGNAL GENERATION

[75] Inventors: Robert W. Vail; Joseph C. Widmont, both of Newport Beach, Calif.

[73] Assignee: Rockwell International Corporation, Pittsburgh, Pa.

[22] Filed: Jan. 8, 1973

[21] Appl. No.: 321,626

Related U.S. Application Data

[62] Division of Ser. No. 200,868, Nov. 22, 1971.

[52] U.S. Cl. .............................. 318/640; 250/570
[51] Int. Cl.² .............................................. G05B 1/06
[58] Field of Search ........................... 318/640, 570; 250/219 DD

[56] References Cited
UNITED STATES PATENTS

| | | | |
|---|---|---|---|
| 2,945,167 | 7/1960 | Gunther | 318/640 |
| 3,004,251 | 10/1961 | Rapacz | 318/640 X |
| 3,193,744 | 7/1965 | Seward | 318/640 X |

Primary Examiner—B. Dobeck

[57] ABSTRACT

Apparatus is provided for generating position signals useful and particularly advantageous as feedback inputs to a servo control system for a paper cutting machine movable back gauge assembly. The generated feedback signals provide binary-coded position information associated only with key control positions established at selected intervals in the back gauge total traverse and pulsed counting information for incremental position changes in each interval between the key control positions.

3 Claims, 10 Drawing Figures

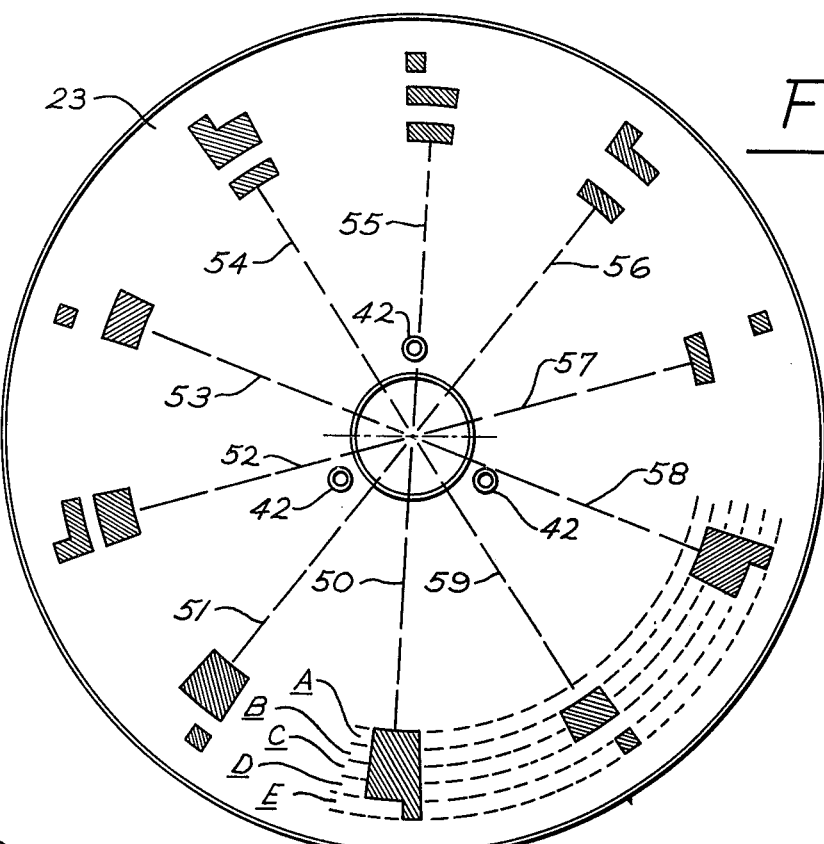
Fig. 4
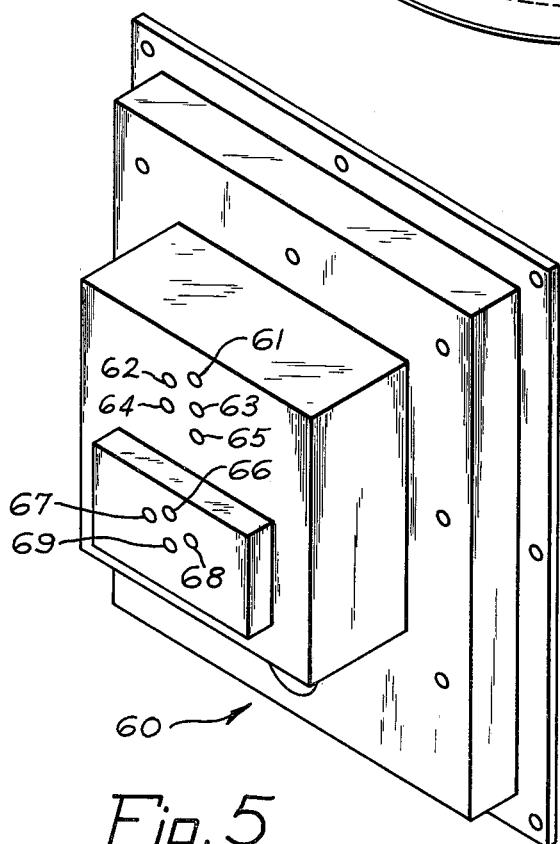
Fig. 5
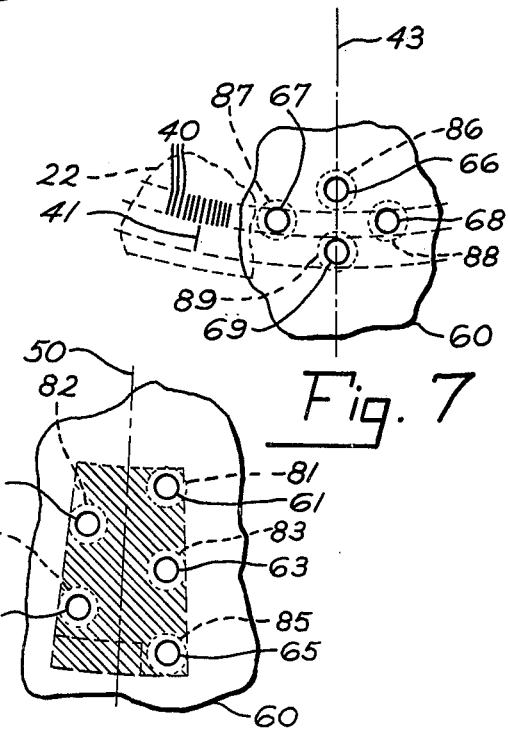
Fig. 7
Fig. 8

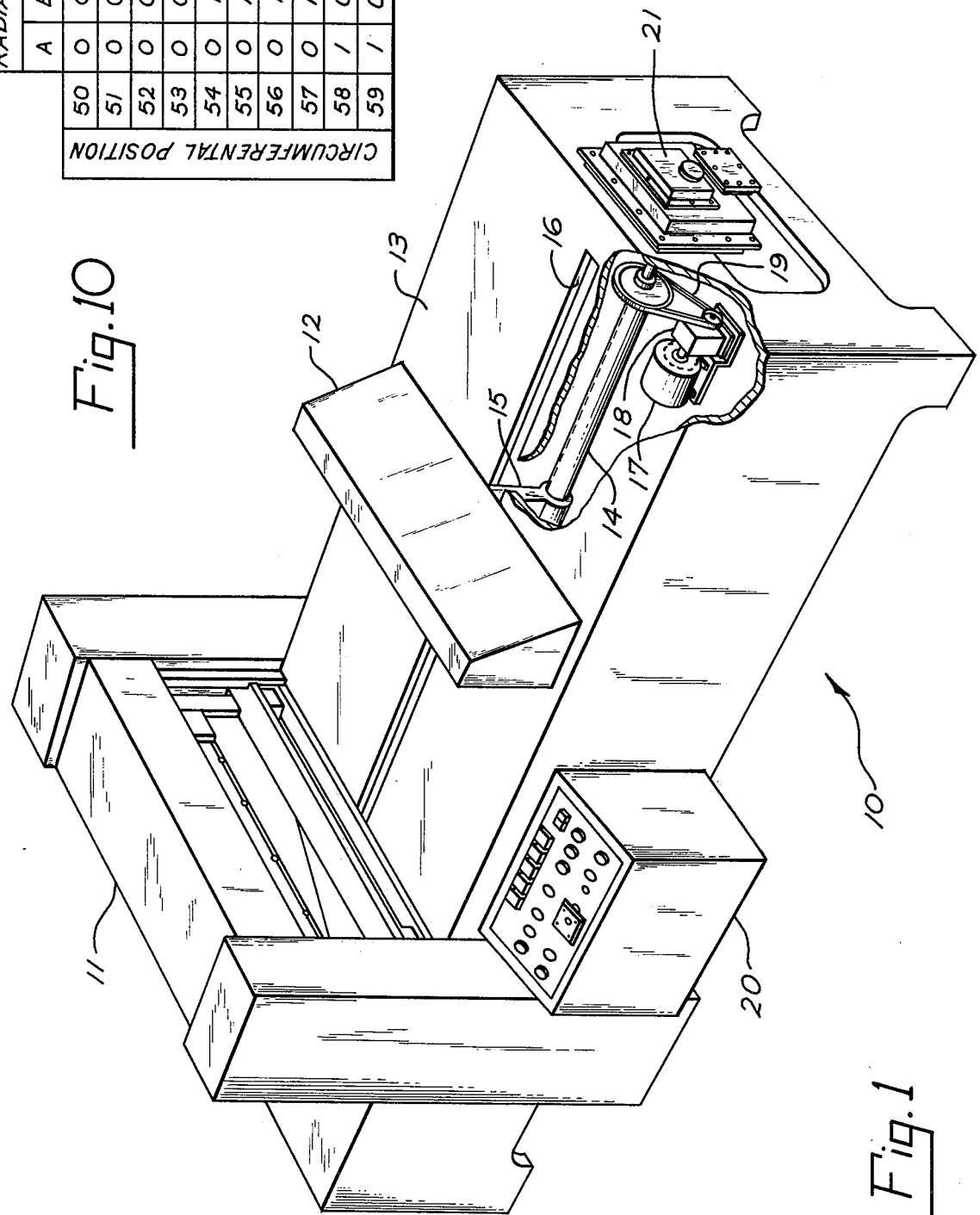

BACK GAUGE POSITION FEED BACK SIGNAL GENERATION

This is a division of application Ser. No. 200,868, filed Nov. 22, 1971.

SUMMARY OF THE INVENTION

A paper cutting machine control system is provided with a novel signal generator means to develop a composite position feedback signal useful in closed loop servo control of the cutting machine back gauge assembly. The signal generator means is driven by the back gauge lead screw free of input backlash and is essentially comprised of a pair of transparent marking discs which each cooperate with a light source and with a different array of phototransistor light detectors. One marking disc is rotated directly by the back gauge lead screw and has uniformly spaced-apart opaque incremental position marks that pass between the system light source and a cooperating phototransistor array to develop incremental position change counting pulses. The other transparent marking disc in the signal generator apparatus is provided with circumferentially spaced-apart opaque areas that periodically register with the system light source and with another array of phototransistor light detectors to develop binary-coded information signals indicative of key control positions established at selected intervals in the range of back gauge total traverse. The key control position transparent marking disc in the signal generator apparatus rotates relative to the lead screw input rotation and is driven through cooperating gears of fixed gear train ratio by the incremental position counting pulse disc. In addition, the marking discs contain strobe markings that cooperate with the generator means light source and still other phototransistor light detectors to precisely identify the key control positions selected in the back gauge total movement range. In one embodiment of the invention, the feedback signal generator apparatus has been utilized in a servo control system that precisely controls the position of a cutting machine back gauge over a total linear movement range of 100 inches in increments of 0.001 inches.

DESCRIPTION OF THE DRAWINGS

FIG. 1 is a schematic perspective view of a paper cutting machine having a back gauge assembly and incorporating the instant invention;

FIGS. 3 and 4 are plan views of the counting pulse and binary-code discs, respectively, of the signal generator apparatus of FIG. 2;

FIG. 5 illustrates the relative positioning and general arrangement of the phototransistor arrays which cooperate with the transparent discs of FIGS. 3 and 4;

FIGS. 7 and 8 respectively, illustrate the registration relationship of the phototransistor arrays of FIG. 6 with the transparent discs of FIGS. 3 and 4;

FIG. 10 is a table detailing the binary-code information developed by the back gauge control position marking disc of FIG. 4.

DETAILED DESCRIPTION

Figure 3:
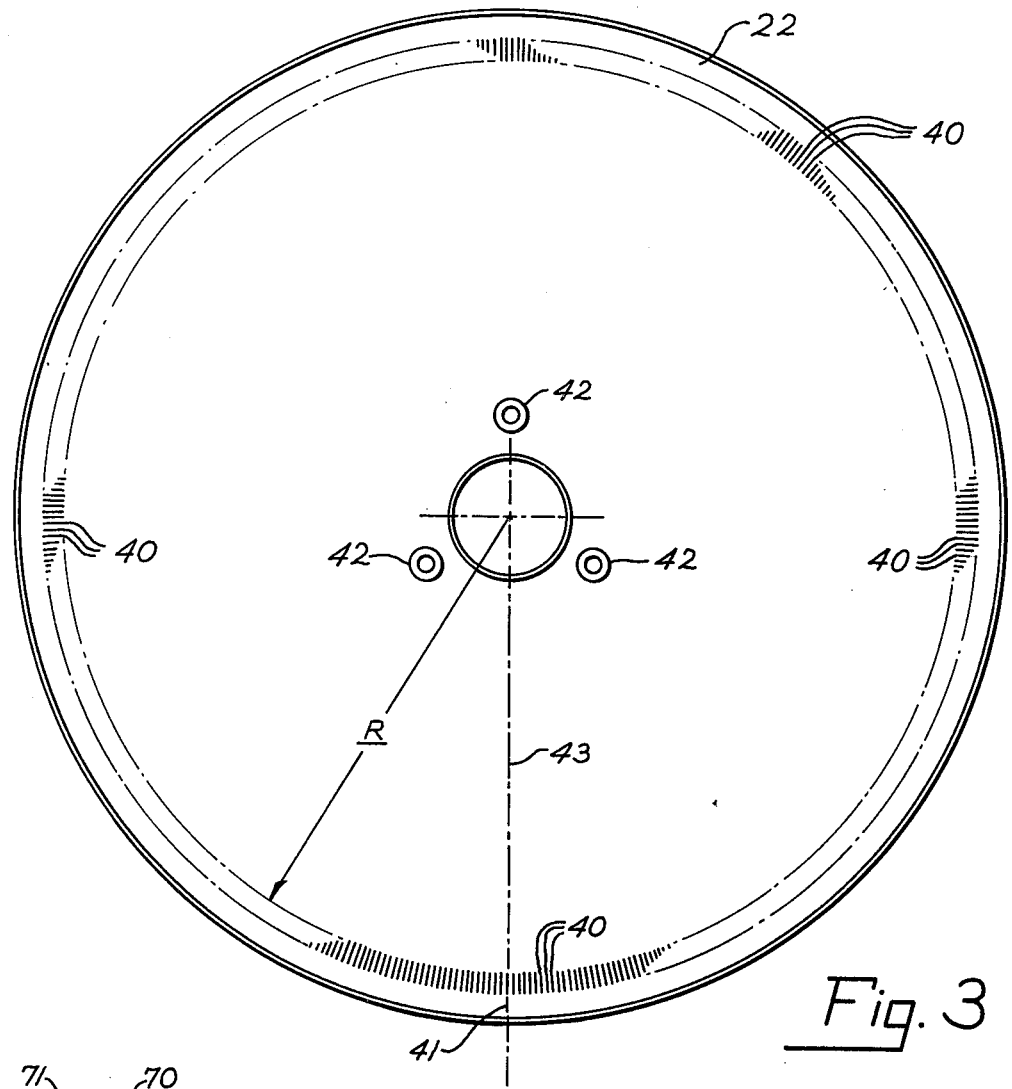

FIG. 1 illustrates a paper cutting machine 10 having a clamp/cutter assembly 11 and incorporating the feedback signal generator apparatus of this invention. A back gauge assembly 12 is supported by table 13 of the cutting machine and is moved linearly by lead screw 14 for the purpose of advancing stacked paper into cooperation with assembly 11 for clamping and cutting. Lead screw 14 engages lug 15 attached to assembly 12. Lug 15 in part slides in slot 16 provided in table top 13. Also as shown in FIG. 1, electric drive motor 17, and pulley/belt subassembly 19 are provided in the paper cutting machine to controllably rotate lead screw 14 in alternate directions and thereby cause linear movement of back gauge assembly 12 to and from assembly 11. For clarity of illustration, a showing of conventional side guides in machine 10 has been omitted from the drawings.

A control console 20 is provided for use by the machine operator and, other than for operating and program characteristics, is essentially of conventional design. Feedback signal generator means 21 in accordance with this invention is used with lead screw 14 to develop input feedback signals for a servo control system to precisely and digitally position the machine back gauge assembly 12 at any selected position in the maximum or total range of back gauge assembly traverse along table 13. For example, apparatus 21 in accordance with this invention has been used in a closed loop servo control system to precisely position a back gauge assembly such as 12 in increments to the nearest 0.001 inches of back gauge travel. In accomplishing such positioning, a digital command signal recorded on magnetic tape in binary-coded form and an input feedback signal derived by operation of assembly 21 are compared to measure error and develop a control signal indicative of the precise degree of correction required. The input feedback signals generated by unit 21 have 2 parts. One part comprises a binary-coded digital signal identifying key control positions in the back gauge total range of traverse. The other input feedback signal part comprises digital counting pulses that are each indicative of an incremental position change intermediate to adjacent back gauge control positions.

Feedback signal generator means 21 is comprised of a pair of transparent marking discs 22 and 23 mounted upon shaft 24 within the housing that is designated generally as 25 and that is attached to machine table 13 by fasteners 26. Shaft 24 is aligned with lead screw 14 and is mechanically connected to that member through anti-backlash coupling 27. Transparent marking disc 22 is sometimes referred to as a counting pulse disc and is mounted on the hub 28 that is fixedly secured to shaft 24 by pin connection 29. Transparent marking disc 23 is mounted on hub 30 also carried by shaft 24 and is sometimes referred to as a binary-code disc. Except for restraint by a cooperating gear train arrangement hereinafter described in detail, hub 30 and attached binary-code disc 23 would be free to rotate on and relative to shaft 24.

Figure 2:
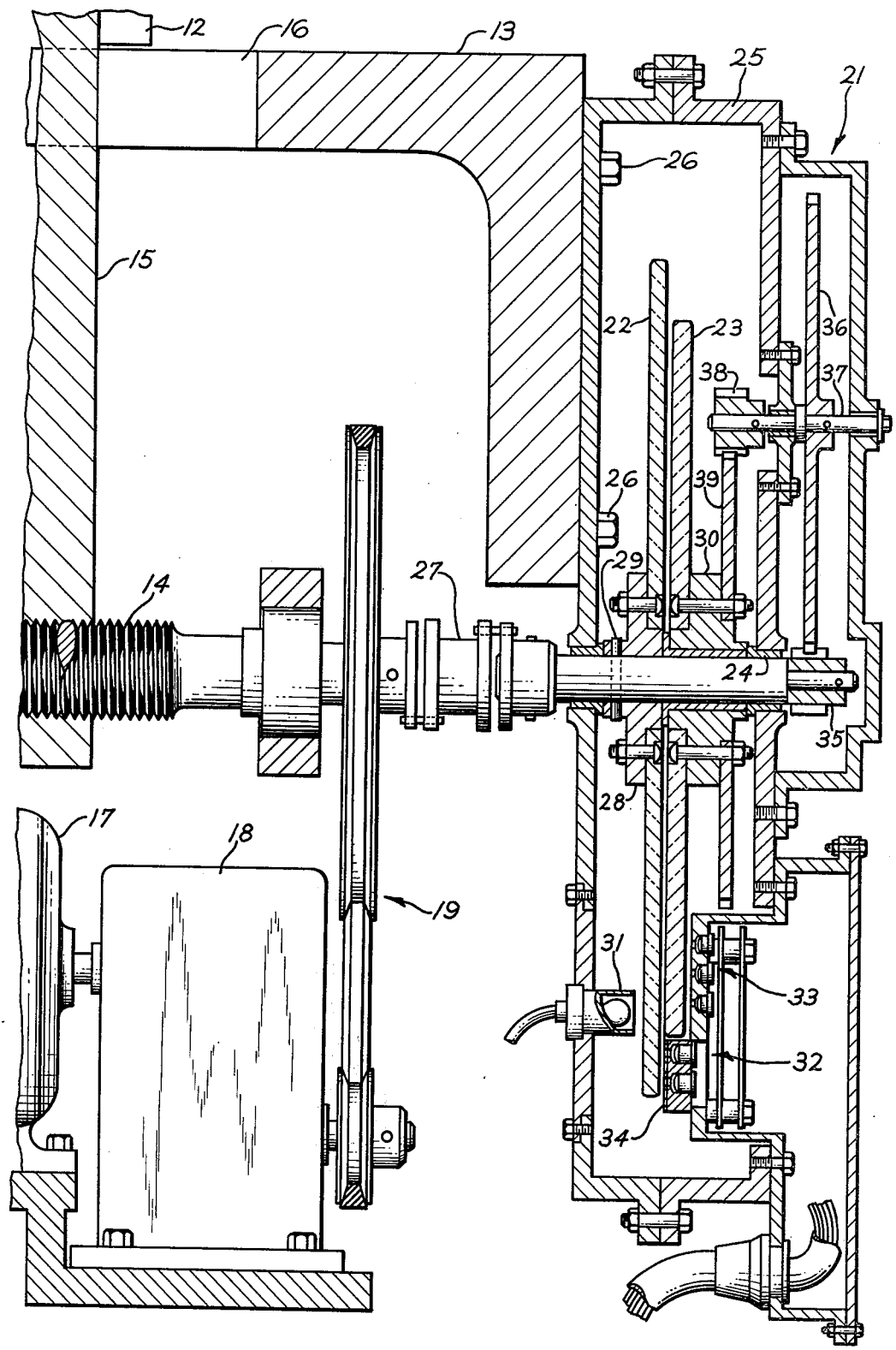
FIG. 2 is a sectional view of a preferred embodiment of the signal generator means assembly illustrated generally with the paper cutting machine of FIG. 1.

Assembly 21 further includes a conventional single lamp light source 31 and two arrays of phototransistor devices referenced as 32 and 33. Array 32 cooperates with and "reads" disc 22 and further preferably cooperates with aperature plate 34. Array 33 is provided in assembly 21 for cooperation with and "reading" of disc 23. The previously mentioned gear train includes gear 35 which is carried by shaft 24 and which rotates at the same rate as transparent disc 22 and lead screw 14. Gear 35 drives cooperating gear 36 mounted on shaft 37. Shaft 37 is positioned parallel to but offset from shaft 24. A smaller gear 38 also carried by shaft 37 cooperates with a gear 39 secured to hub 30. In one embodiment of apparatus 21, lead screw 14 advances back gauge 12 of the paper cutting machine one inch per lead screw revolution and the gear train made up of gears 35, 36, 38 and 39 rotate disc 23 one complete revolution for each 100 complete revolutions of shaft 24 or lead screw 14. Further details regarding marking discs 22 and 23 and with respect to phototransistor arrays 32 and 33 are provided in the figures of the drawings following FIG. 2. No anti-backlash coupling is required intermediate to gear 35 and gear 39.

FIG. 3 is an illustration of the markings provided on counting pulse disc 22. Such disc, in a preferred embodiment, includes 500 stripes or bands 40 of optically opaque ink or paint positioned in a circle a uniform distance R from the axis of rotation of shaft 24. One additional stripe 41 is placed along radial line 43 farther from the shaft axis than marks 40 and is designated a "zero" reference or strobe position mark. The openings 42 provided in disc 22 cooperate with fasteners used in securing disc 22 to hub 28. As disc 22 rotates with lead screw 14, opaque stripes 40 and the intermediate transparent areas alternately block and transmit light sourced by lamp 31 adjacent phototransistors in array 32. As developed later in this description, a series of essentially square wave counting pulses are originated at certain of the phototransistors in array 32 for processing in logic circuitry in the paper cutting machine servo control system. In one embodiment of disc 22, a total of 500 opaque stripes 40 are uniformly spaced circularly to develop 1,000 counting pulses as disc 22 is rotated through one complete revolution. Since the lead screw 14 advanced back gauge 13 one inch for each revolution, the position resolution obtained by the servo control system is in increments of 0.001 inch.

FIG. 4 is an illustration of the markings provided on transparent binary coded disc 23. Specifically, the embodiment of disc 23 shown in the drawings is provided with 10 circumferentially spaced apart positions 50 through 59 which have different associated opaque binary-code patterns that each relate to a different control position in the total range of movement of back gauge 12. Position 50 for example, identifies a zero inch position and a 100 inch position at the extremes of the total range of movement for back gauge 12. The opaque patterns at positions 51 through 59 are uniformly spaced apart circumferentially and accordingly, for example, identify intermediate positions at 10 inch intervals throughout the range of total movement. Each opaque pattern at positions 50 through 59 passes between lamp 31 and particular phototransistors in phototransistors array 33 to block light from array 33 in a particular pattern. As hereinafter described, the phototransistor devices in array 33 produce a binary-coded feedback signal indicative of the associated key control position in the back gauge total range of traverse. In the FIG. 4 embodiment, the opaque area patterns at positions 50 through 59 specifically cooperate with array 33 to develop conventional 1-2-4-8 binary-coded decimal signals for each of the different intermediate control positions. A truth table for the binary-coded decimal signals sourced by the opaque areas at illustrated radial zones A through E and positions 50 through 59 of disc 23 is provided in FIG. 10.

FIG. 5 illustrates a support member 60 that is installed in housing 25 of encoder assembly 21 to properly locate and support the phototransistor devices employed in arrays 32 and 33. It is important to note that the openings 61 through 65 for array 33 are positioned to register with the zones A through E of disc 23 when support member 60 is properly installed in assembly 21 relative to the location of shaft 24. In similar manner, openings 66 through 69 for array 32 are positioned to register with the marking zones of transparent disc 22 when support 60 is installed in housing 21. Opening 66 cooperates with an entirely transparent region of disc 22 for hereinafter described operating safety and purposes, openings 67 and 68 register with the annular zone that contains markings or stripes 40, and opening 69 registers with the disc annular zone that contains stripe 41 for strobing or zero reference purposes. See FIGS. 7 and 8.

Figure 6:
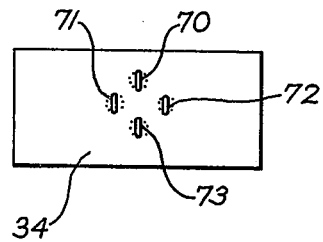
FIG. 6 illustrates an apperture plate that cooperates with the incremental position array of FIG. 5 and with the transparent disc of FIG. 3.

Because of the normally desired close spacing of markings 40 and 41 on disc 22, it is preferred to use apertures to sharpen the transistion between light and dark areas during disc rotation to thereby obtain better resolution. To this end aperture plate 34, illustrated in detail in FIG. 6, is provided in assembly 21. Apertures 71 and 72 in plate 34 each have a configuration that generally corresponds to, but is slightly smaller than, the configuration of each of the stripes 40 in disc 22. For the purpose of developing direction of rotation information, aperatures 71 and 72 are spaced apart an odd multiple of one half spaces where a space is the width of an individual stripe 40 or the transparent space between two immediately adjacent stripes. Aperture 73 has a configuration similar to apertures 71, 72 and cooperates with stripe 41 provided in disc 22 for zero reference purposes. It should be noted that aperture plate 34 and the openings for the transistor devices in arrays 32 and 33 are so positioned that a hereinafter described counter reset signal is developed whenever stripe 41 registers with aperture 73 concurrently with the registration of an opaque pattern area in annular zone E of disc 23 with opening 65 and phototransistor device supported therein.

FIGS. 7 and 8 illustrate the location of individual phototransistor devices 81 through 89 relative to the radial and circumferential zones of cooperating discs 22 and 23. Phototransistors 87 and 88 (outlined in FIG. 7) cooperate with counterbored openings 67 and 68, respectively, and function in the development of counting pulse signals indicative of incremental changes in position of back gauge 12. For a typical section for representative counterbored opening 67, for example, see FIG. 2. Phototransistor 89 is positioned for reading strobe mark 41 on marking disc 22 and is contained within the counterbored opening referenced as 69. This particular phototransistor (89) is utilized to develop a pulsed signal that indicates strobe marking 41 is in registry with basic reference line 43. Phototransistor 86 cooperating with opening 66 is provided for operational safeguard purposes in the event there is a failure of lamp 31. The output signal of phototransistor 86 is utilized to disable operation of paper cutting machine 10 until a suitable replacement light source is provided.

Phototransistors 81 through 84 cooperate with counterbored holes 61 through 64 respectively and are provided to develop a hereinafter discussed binary-coded signal which identifies particular key control positions in the total range of back gauge traverse. Phototransistor 85 in opening 65 generates a pulsed logic signal that, when coincident with the pulsed logic generated by phototransistor 89, initializes the counter in the back gague servo control system which accumulates the incremental position change counting pulses.

Figure 9:
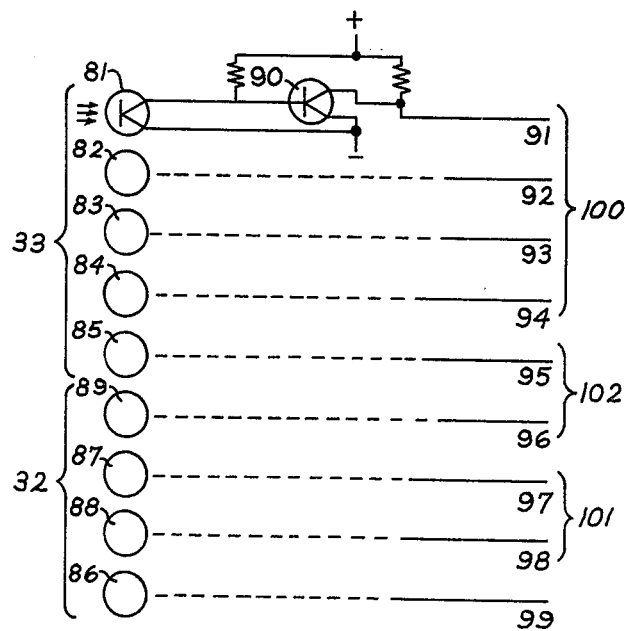
FIG. 9 illustrates phototransistor circuits and cooperating logic utilized in connection with the novel signal generator means.

A preferred arrangement for developing usable feed back position signals in assembly 21 is shown in FIG. 9. A preferred circuit incorporating representative phototransistor 81 is illustrated in detail in that Figure and includes a signal transistor 90 for amplifying the output signal of phototransistor 81. In phototransistor 81 the resistance from collector to emitter varies according to the intensity of light that falls on the phototransistor active surface after passage, if any, of light from lamp 31 through transparent disc 23 to thereby result in a corresponding change in voltage level at the input to amplifying transistor 90. The output from signal transistor 90 is conducted via lead 91 to an input terminal of a servo system digital counter, for instance. The similar signals generated by the response of phototransistors 82 through 84 produce output signals 92 through 94 in a similar manner and such are conducted as different input bits to other input terminals of the servo system digital counter. In the preferred signal generator apparatus embodiment shown in the drawings, the outputs at 91 through 94 are for the four most significant bits in a binary-code of conventional 8-4-2-1 notation.

The output signals of phototransistors 85 and 89 source similarly pulsed signals at 95 and 96 that when coincident in time enable the servo system digital logic to accomplish the required initialization of the incremental position change counter. The outputs of phototransistors 87 and 88 are conducted by means of conductors 97 and 98 to logic circuits accomplishing quadrature detection and counting pulses production functions. The outputs of the quadrature detector and counting pulse functions drive an accumulative counter either up or down. As previously mentioned phototransistor 86 develops a pulsed signal that is used for disabling paper cutting machine 10 in the event of failure of lamp 31.

By use of an accumulative counter for keeping a count of the incremental position changes of the paper cutting machine back gauge and by periodically checking the counter total against back gauge position feedback reference, the siginal generator apparatus of the present invention provides in a servo control system the accuracy of an absolute encoder with the low cost and improved reliability of the accumulative counter approach. Also, the signal generator construction involved in this instance permits all the light detector devices to be flexibly wired and not fixed to included circuit board components. The proper positioning of the light detector devices with respect to markings on discs 22 and 23 is maintained by support member 60 in each instance and not by the positioning of a circuit board relative to the housing assembly.

The apertures employed for phototransistor devices 81 through 89 are grouped and accurately positioned in the novel signal generator within a relatively narrow radial band thereby permitting the use of one light source and reduced parallax effects as to light intensity. The compactness of the assembly provided in the invention also in part is achieved by reason of the mounting of transparent discs 22 and 23 immediately adjacent each other on the same shaft and by use of the single lamp as a source of light for energizing the phototransistor devices. In the event of a light source failure, such will be immediately detected in the present arrangement and the likelihood of producing erroneous readings as a result of the presence of other operative light sources is eliminated.

We claim:

1. Servo control system feedback signal generator means comprising, in combination: rotatable input shaft means, first transparent marking disc means secured to said input shaft means for rotation in a plane normal to the rotational axis of said shaft means, said first transparent marking disc means having circumferentially spaced-apart opaque markings with uniformly spaced-apart edges which each correlate to an incremental change in the rotational position of said shaft means; a second transparent marking disc means supported for rotation about an axis, said second transparent marking disc means having circumferentially spaced-apart opaque binary-code patterns which each correlate to a different multiple turn control position of said input shaft means, gear train means coupling said second transparent marking disc means in driven and reduced rate of rotation relation relative to said first transparent marking disc means, lamp means positioned in cooperating relation to said first and second transparent marking disc means and to said opaque markings and patterns, and a pair of photoelectric light detector device arrays positioned in cooperating relation to said first and second transparent marking disc means and said opaque markings and patterns and in illuminated relation relative to said lamp means, one of said arrays producing binary-code signals correlated to different multiple turn control positions of said input shaft means, and the other of said arrays producing pulsed signals correlated to incremental changes in the positions of said input shaft means in intervals intermediate adjacent of said input shaft means multiple turn control positions.

2. The servo control system feedback signal generator means invention defined by claim 1 wherein said second transparent marking disc means is supported for rotation on and relative to said input shaft means at a position axially adjacent said first transparent marking disc means, said lamp means being positioned at one side of said first and second transparent marking disc means and said pair of photoelectric light detector device arrays being positioned at the other side of said first and second transparent marking disc means and in aligned relation to the path of rotation of said opaque markings and patterns and in illuminated relation relative to said lamp means.

3. The servo control system feedback signal generator means invention defined by claim 2 wherein said lamp means is a singular lamp means, said singular lamp means being positioned in illuminating relation to each of said photoelectric light detector device arrays.

* * * * *